(12) United States Patent
Zhou

(10) Patent No.: US 10,078,662 B2
(45) Date of Patent: Sep. 18, 2018

(54) DATA STORAGE IN A NETWORK

(71) Applicant: International Business Machines Corporation, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 14/887,398

(22) Filed: Oct. 20, 2015

(65) Prior Publication Data

US 2016/0154837 A1      Jun. 2, 2016

(30) Foreign Application Priority Data

Nov. 28, 2014   (CN) .......................... 2014 1 0710929

(51) Int. Cl.
*G06F 17/30* (2006.01)

(52) U.S. Cl.
CPC .... *G06F 17/30424* (2013.01); *G06F 17/3056* (2013.01)

(58) Field of Classification Search
None
See application file for complete search history.

(56) References Cited

U.S. PATENT DOCUMENTS

| 8,589,538 | B2 | 11/2013 | Bargoti et al. |
| 8,621,051 | B2 | 12/2013 | Agarwala et al. |
| 2005/0160419 | A1* | 7/2005 | Alam .................. G06F 8/67 717/174 |
| 2007/0022087 | A1 | 1/2007 | Bahar et al. |
| 2008/0289000 | A1* | 11/2008 | Young .................. G06F 8/70 726/1 |
| 2009/0157774 | A1* | 6/2009 | D'Amore .......... G06F 17/30091 |
| 2009/0265704 | A1* | 10/2009 | Branda ................. G06F 9/5094 717/176 |
| 2010/0036858 | A1 | 2/2010 | Patel |
| 2010/0115461 | A1* | 5/2010 | Onda ...................... G09G 5/14 715/790 |

(Continued)

FOREIGN PATENT DOCUMENTS

| CN | 101911074 A | 12/2010 |
| CN | 102349055 A | 2/2012 |

(Continued)

OTHER PUBLICATIONS

Bhadkamkar et al., "BORG: Block-reORGanization for Self-optimizing Storage Systems", USENIX Association, 7th USENIX Conference on File and Storage Technologies, Feb. 24-27, 2009, San Francisco, California, pp. 183-196.

Pending CN Application No. 201410710929.3, filed on Nov. 28, 2014, entitled: "Method and System for Data Storage in Network", 28 pages.

(Continued)

*Primary Examiner* — Hung Le
(74) *Attorney, Agent, or Firm* — L. Jeffrey Kelly

(57) ABSTRACT

A method and computer system for data storage in a network including receiving, from a user device, a target data to be stored, determining an application associated with the target data in the user device, obtaining a storage pattern generated by monitoring a historical data, the storage pattern indicating storage characteristics of the historical data, the historical data being associated with the application, and controlling a storage of the target data in a network based on the storage pattern.

18 Claims, 4 Drawing Sheets

(56) References Cited

U.S. PATENT DOCUMENTS

| | | | |
|---|---|---|---|
| 2011/0289287 A1* | 11/2011 | Yamamoto | G06F 3/0605 |
| | | | 711/156 |
| 2012/0255018 A1* | 10/2012 | Sallam | G06F 12/14 |
| | | | 726/24 |
| 2012/0297138 A1* | 11/2012 | Augenstein | G06F 1/3203 |
| | | | 711/117 |
| 2014/0095582 A1 | 4/2014 | Eshel et al. | |
| 2014/0136571 A1 | 5/2014 | Bonvin et al. | |
| 2016/0142482 A1* | 5/2016 | Mehta | G06F 17/30575 |
| | | | 709/203 |

FOREIGN PATENT DOCUMENTS

| | | |
|---|---|---|
| CN | 102567480 A | 7/2012 |
| CN | 102713824 A | 10/2012 |

OTHER PUBLICATIONS

EMC2 where information lives, "EMC Atmos Cloud Optimized Storage for Web services", Best Practices Planning, White Paper, Apr. 2010, 29 pages.

Kroeger et al., "The Case for Efficient File Access Pattern Modeling", Mar. 29-30, 1999, Rio Rico, Arizona, Proceedings of the Seventh Workshop on Hot Topics in Operating Systems, P, 6 pages.

Liu et al., "Understanding Data Characteristics and Access Patterns in a Cloud Storage System", 2013 13th IEEE/ACM Internatinal Symposium on Cluster, Cloud, and grid Computing, pp. 327-334.

Mesnier et al., "File classification in self-* storage systems", Appears in Proceedings of the First International Conference on Autonomic Computing (ICAC-04), New York, NY. May 2004, 8 pages.

* cited by examiner

DATA STORAGE IN A NETWORK

BACKGROUND

Embodiments of the present invention generally relate to the field of data storage, and more specifically to a method and system for data storage in a network.

With the development of network technology and particularly cloud technology, more and more user data are stored in network locations. For example, after one application is installed in a user device, various types of data may be generated during use of the application. For example, the user may communicate with other user using a communication application installed in the user device, which generates chatter records. The data generated by the application may be partially or completely transferred to the server, e.g., a cloud server, and stored by the server in a network storage device.

The server may generally be composed of multiple types of or multiple layers of software systems. For example, a cloud server may store data from a user device into different storage devices. Different storage devices always have different characteristics and are adapted to store different kinds of data. For example, the reliability of some storage devices is significantly higher than other storage devices and thus may be used to store data of applications having a higher security requirement. The data reading speed of some other storage devices is faster than other storage devices and thus may be used to store the data of the application that needs a faster response.

In traditional processes for data storage in a network, the network server may not efficiently and accurately determine the specific nature of the data received from the user device and thus may not store the data in an appropriate storage device. Some servers allow the user to explicitly specify data storage needs. However, this requires the user to have higher professional skills, and/or a deep understanding of the characteristics of the storage device.

SUMMARY

Generally, embodiments of the present invention may provide a solution for data storage in a network.

According to one aspect of the present invention, a method for data storage in a network may include: receiving target data to be stored from the user device; determining an application associated with the target data in the user device; obtaining a storage pattern generated by monitoring historical data, the storage pattern indicating storage characteristics of the historical data, the historical data being associated with the application; and controlling storage of the target data in the network based on the storage pattern.

According to another aspect of the present invention, a system for data storage in a network may include: a data receiving unit configured to receive target data to be stored from the user device; an association determining unit configured to determine an application associated with the target data in the user device; a pattern obtaining unit configured to obtain a storage pattern generated by monitoring historical data, the storage pattern indicating storage characteristics of the historical data, the historical data being associated with the application; and a storage controlling unit configured to control storage of the target data in the network based on the storage pattern.

According to embodiments of the present invention, an application associated with target data to be stored may be identified. Then, historical data associated with the application may be obtained. During the running process, the server has extracted the pattern information describing storage characteristics of these historical data by monitoring and learning the storage and access behaviors of these historical data. With the extracted pattern, efficient and accurate storage optimization of the current to-be-stored data may be adaptively achieved. Other features and advantages of the present invention will become easily understood through the description below.

BRIEF DESCRIPTION OF THE DRAWINGS

The following detailed description, given by way of example and not intended to limit the invention solely thereto, will best be appreciated in conjunction with the accompanying drawings, in which.

The drawings are intended to depict only typical embodiments of the invention. In respective figures, same or like reference numerals are used to represent the same or like components.

DETAILED DESCRIPTION

Some preferable embodiments will be described in more detail with reference to the accompanying drawings, where the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
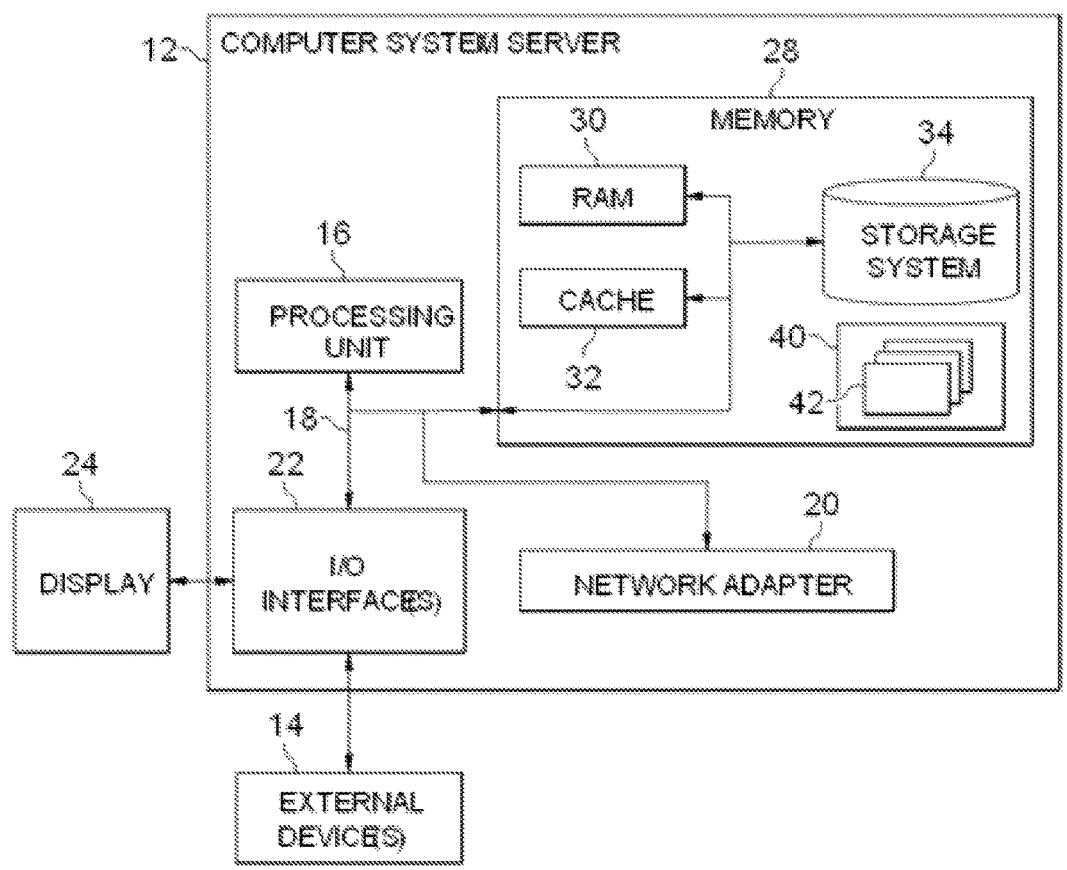
FIG. 1 shows an exemplary computer system/server which is applicable to implement embodiments of the present invention.

Referring now to FIG. 1, an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, pattern, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Hereinafter, the mechanism and principle of embodiments of the present invention will be described in detail. Unless otherwise stated, the term "based on" used hereinafter and in the claims expresses "at least partially based on." The term "comprise" or "include" or a similar expression indicates an open inclusion, i.e., "including, but not limited to . . . ." The term "plural" or a similar expression indicates "two or more." The term "one embodiment" indicates "at least one embodiment." The term "another embodiment" indicates "at least one another embodiment." Definitions of other terms will be provided in the description.

Figure 2:
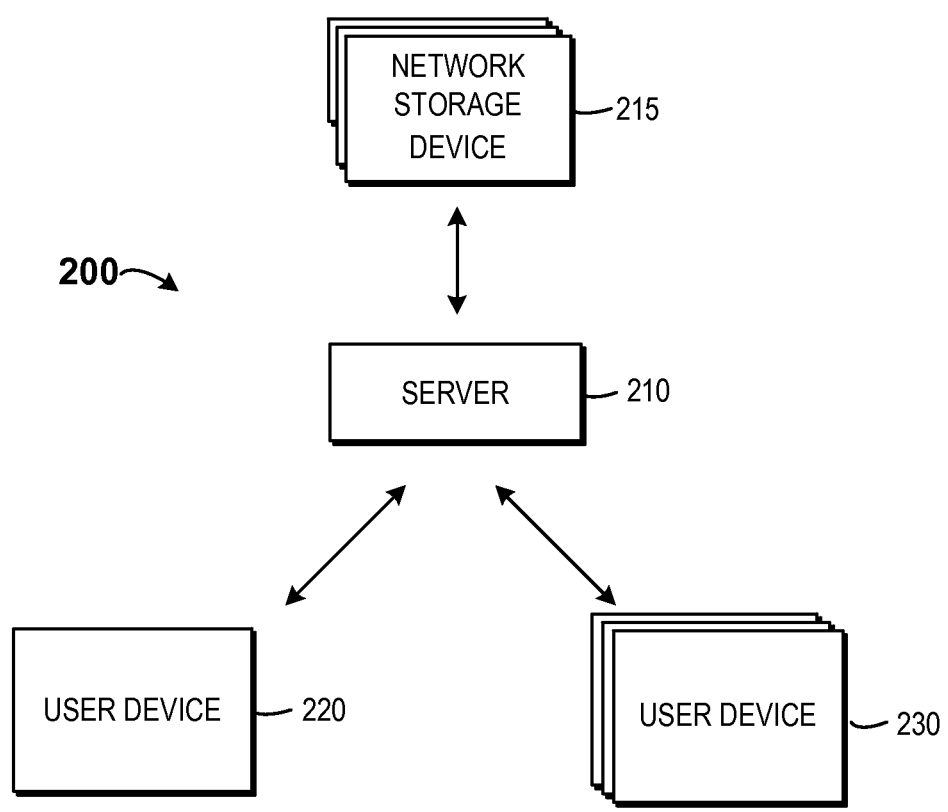
FIG. 2 shows a schematic block diagram of a network storage environment in which embodiments of the present invention may be implemented.

Referring now to FIG. 2, an exemplary block diagram of an environment 200 in which embodiments of the present invention may be implemented is shown. As shown in the Figure, the environment 200 may include: a server 210, one or more network storage devices 215 managed by the server 210, and user devices 220 and 230.

The server 210 may be any server capable of providing data storage services to a user. In one embodiment, the server 210 is a dedicated server specifically for managing data storage in a network. Alternatively, in one embodiment, the server 210 may also provide other services to the user while providing the data storage server, e.g., instant communication services, email services, social network services, etc.

The network storage device 215 is managed and controlled by the server 210. In one embodiment, the network storage device 215 may be a data storage device independent of the server 210 and controlled thereby. Alternatively, in one embodiment, the network storage device 215 may be located in the same physical machine with the server 210. The network storage device 215 may include any appropriate data storage medium, regardless of it is currently known or future developed. The data storage medium may include a volatile storage medium and/or non-volatile storage medium. Examples of the data storage medium may include, but are not limited to, a hard disk, a floppy disk, a CD, a magnetic tape, etc.

Particularly, different network storage devices 215 may have different device performances. For example, some network storage devices can provide a shorter response time; some network storage devices can provide relatively reliable data security; some network storage devices are suitable for permanently storing data, etc.

Either of the user devices 220 and 230 may be a dedicated or multi-function electronic device. The user device 220 and/or 230 may be an electronic device of a fixed type, e.g., a personal computer (PC) or a server. Alternatively or additionally, the user device 220 and/or 230 may be a mobile device, e.g., a mobile phone, a laptop computer, a tablet computer, a personal digital assistant (PDA), a wearable computing device, etc.

In particular, at the ease of discussion, the user device is shown as the user device 220 and one or more user devices 230 in FIG. 2. However, it does not signify that the user device 220 and the user device 230 are surely different. The user devices 220 and 230 may have the same or different types, functions, features, etc.

Each user device 220, 230 may run one or more applications. The applications in the user devices 220, 230 may have associated data. For example, the application may generate data during its application process. For example, the instant communicating tool will generate a chat record, a log file, user information profile, etc. Alternatively or additionally, the user may input data to an application, store data in association with the application, or associate data with the application in any other manner. As other example, the data associated with the application may also include data indicating one or more of the following: settings of the application, profile information of the user, parameters and/or configurations of the system or running environment, etc.

The user device 220 and/or 230 may send all or a part of data associated with the application thereon to the server 210. As a response, the server 210 may store the received data in one or more network storage device 215. It should be understood that the user device 220 and/or 230 may save a local duplicate of the data sent to the server 210 for remote storage. For example, for an instant messaging application, all chat records may be saved in the network storage device 215. Meanwhile, all or a part of chat records may be stored locally at the user device 220 and/or 230. Of course, in some cases, the data may be only remotely saved at the network side. The scope of the present invention is not limited in this aspect.

The server 210 may communicate with the user devices 220 and 230 by virtue of any appropriate communication medium. Examples of the communication medium may include, but is not limited to: a computer network, e.g., an Internet, an Intranet, a Local Area Network (LAN), a Metropolitan Area Network (MAN); a communication network, e.g., second generation (2G), third generation (3G), fourth generation (4G) and any appropriate telecommunications network; a near-field communication network, e.g., a Bluetooth, infrared, etc.

Figure 3:
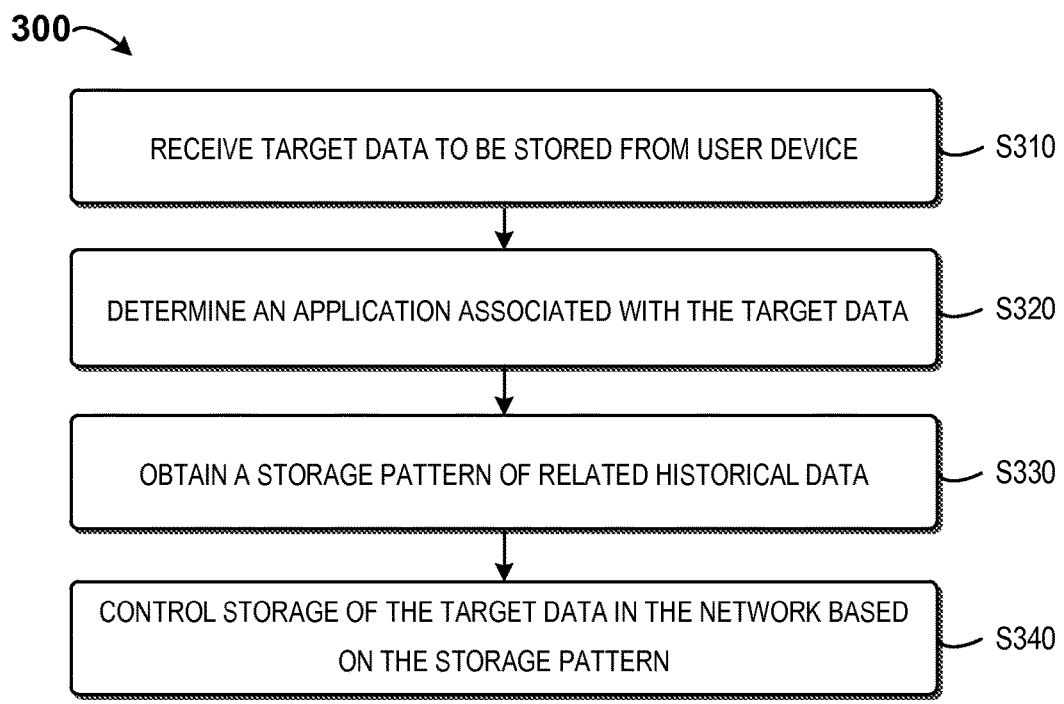
FIG. 3 shows a schematic flow diagram for data storage in a network according to embodiments of the present invention.

Referring now to FIG. 3, a method 300 for data storage in a network according to an embodiment of the present invention is presented. The method 300 for example may be performed by a server 210 as shown in FIG. 2. As shown in the figure, the method 300 starts from step S310, where to-be-stored data (hereinafter referred to as "target data") are received from the user device. For example, in one embodiment, the target data may be organized in the file.

In step S320, the server determines an application associated with the received target data in the user device. According to embodiments of the present invention, any appropriate method may be employed to determine with which application in the user device the received target data is associated. For example, in one embodiment, when a user of the user device sends target data, he/she may send an identifier (e.g., name of the application) of an associated application to the server manually.

Alternatively or additionally, in one embodiment, the server may automatically identify an application associated with the application based on properties of the received target data. In one embodiment, as mentioned above, besides being sent to the server, the target data may also be locally stored in the user device within at least a period of time. For example, while a log file that records an application running state is sent to the server, it will be locally stored in the user device. In such an embodiment, the server may obtain a local storage location of the target data, and determine, based on the local storage location, with which application(s) on the user device the target data is associated.

For example, in one embodiment, an application associated with the target data may be determined by analyzing a file directory path of the target data in the user device. It would be appreciated that for the same application, its instances on different user devices usually store the same kind of data in the same or similar file directory path. It is particularly so for user devices running with the same kind of operation system (OS). Only as an example, a given instant messaging application will generally store the user's chat records under the same file directory, e.g., Root:/UserData/Chat/record.txt (wherein "Root" refers to the root directory where the application is located).

In such an embodiment, the server 210 may determine and record in advance common file directory paths used by various applications for storing their various types of data. Such information, for example, may be stored in a file or database that is accessible to the server 210. When any user device (e.g., user device 220) sends target data associated with the particular application to the server 210, the file directory path for the local storage location of the data may be sent to the server 210 along with the target data. Therefore, the server 210 may compare the received file directory path with a priori knowledge to thereby determine an application associated with the target data.

In particular, the inventors noticed that in the file directory path used by the application for storing target data, an identifier associated with the application may usually be included, e.g., a name or alias of the application. For example, the name(s) of one or more folders in the file directory path may include a name or alias of an application. As an example, suppose the name of a certain application is ABC, then in the file directory path for the local storage location of the target data associated with the application, it is very likely that a character string "ABC" may be included. For example, the log data associated with the application may be stored in the Root:/ABC/log.txt (where "Root" should be the root directory where the application is located). In such an embodiment, the server may search, in a character string representing the local storage location of data, an identifier associated with an application, e.g., the name or alias of the application. If such an identifier is found, it may be determined that the received data is associated with the application indicative of the identifier.

Alternatively or additionally, in one embodiment, the identifier of the application may also be included within data attributes. In one embodiment, the target data may be sent to the server from the user device in a form of a file. In this embodiment, the attributes of the file may indicate an application creating the file. Therefore, the server 210 may obtain the identifier of the application by parsing the data attributes, thereby determining the application associated with the target data. The identifier of the application may also be included within other attributes of the target data, and the scope of the present invention is not limited in this aspect.

It would be appreciated that what are described above are only several feasible exemplary embodiments, not intended to limit the scope of the present invention in any manner. Any currently known or future developed technical means may be employed to determine an application associated with the received target data on the user device. For example, in an alternative embodiment, an application associated with the target data may be determined by analyzing the content of the target data per se. As an example, an identifier of an application may be searched among the content of the target data, and so on. Moreover, as mentioned above, a user may be required to specify the association relationship between the application and the target data in a manual manner.

Additionally, it would be appreciated that the target data received at the server is not only associated with an application in user device. On the contrary, in one embodiment, the target data may be associated with two or more applications in the user device.

The method 300 then proceeds to step S330, in which a storage pattern of relevant historical data is obtained. In the context of the present invention, the relevant historical data refers to the data previously received and stored by the server. These data and the data received in step S310 are associated with the same application (called "target application"). For example, in one embodiment, if it is determined that the currently received data are associated with an image processing application XX (hereinafter "application XX"), then the historical data are data that were previously received and stored and are associated with the application XX.

Additionally or alternatively, historical data may also be associated with an application similar to the target application, thereby being indirectly associated with the target application. For example, in one embodiment, the server may maintain a list of similar applications. The similarity between applications may be determined based on any factor or any combination such as a type, function, service, operation pattern, and developer of the application, etc. for any given application, the server may determine one or more other applications similar thereto through retrieving the list.

In this embodiment, historical data may include associated data of the application similar to the application associated with the current target data. Only for the sake of discussion, still consider the example as described above. Suppose the server determines that an application YY is another image processing application similar to the application XX. At this point, the server may use previous data associated with the application YY, as relevant historical data for the current target data.

In particular, in one embodiment, at least a part of the historical data may be received from a user device different from the current target data. For example, with reference to the example of FIG. 2, suppose the target data received by the server 210 comes from the user device 220 and is associated with an application A in the user device 220. In this case, at least a part of the historical data may be data that is from one or more user devices 230 and associated with the application A or a similar application. In one embodiment, a part or all of the historical data may come from the same user device as the current target data.

According to embodiments of the present invention, the server 210 may monitor a storage characteristic of associated historical data, thereby further generating a storage pattern describing this characteristic. In other words, for each or each kind of similar application, the server 210 may monitor in real time or periodically the historical data associated with such application to find regular features exhibited by such kind of data during storage and access. According to embodiments of the present invention, the storage pattern may describe characteristics or features associated with the historical data in any aspect of the storage and/or access.

As an example, in one embodiment, the storage characteristic of historical data may include an access frequency of historical data, namely, the time interval for the historical data to be accessed. For historical data from different user devices, the server may average its access frequency, take the maximum value, take the minimum value, or perform any other additional and/or alternative operation. The result may be used as the access frequency for historical data.

Additionally or alternatively, in one embodiment, the storage characteristics of historical data may include an access type for the historical data. For example, the server may determine whether the historical data are mainly read, modified (written) or both after being stored. In particular, the access type may indicate whether the historical data have a read-only attribute (i.e., it was only read, without being modified) or write-only attribute (i.e., it was only modified, without being read) after being stored.

Additionally or alternatively, in one embodiment, the storage characteristics of historical data may include an input/output (I/O) response time for access of the historical data. In one embodiment, the I/O response time of historical data may be quantitatively recorded. Alternatively or additionally, in one embodiment, the I/O response time may be qualitatively divided into a plurality of predefined levels, e.g., "very fast," "fast," "normal," "slow," "very slow." Historical data associated with a specific application may be assigned a certain level.

Additionally or alternatively, in one embodiment, the storage characteristics of historical data may include time length for storage of the historical data. By monitoring the time length for storage of the historical data, it may be determined that the historical data is generally stored as temporary data or permanent data. For historical data from different user devices, the server may average lasting time of their storage, take the maximum value, take the minimum value, or perform any other additional and/or alternative operation. The result may be used as lasting time of storage of the historical data.

Additionally or alternatively, in one embodiment, the storage characteristics of historical data may include a size of the historical data. For historical data from different user devices, the server may average their sizes, take the maximum value, take the minimum value, or perform any other additional and/or alternative operation. The result may be used as the size of the historical data.

Additionally or alternatively, in one embodiment, the storage characteristics may include variation trend of size of the historical data. The inventors noticed that: in many application scenarios, after the data are stored, their sizes always vary with time. Therefore, the server may track and monitor size variation situation within a given time window after the data are stored. For example, in one embodiment, the server may record an initial size and a termination size of the data within a plurality of given periods of time. Of course, variation of the data sizes with time may be continuously recorded.

Alternatively or additionally, in one embodiment, the storage characteristics of historical data may include an access association between historical data and other data. Specifically, in such an embodiment, the server may monitor whether the historical data and other data are inclined to be accessed together within a predetermined time interval. For example, if the server finds that before or after the historical data being associated with application A are read and/or written, data associated with the other application B are always read and/or written within a predetermined temporal adjacent domain, it may be regarded that the two kinds of data have access association with each other.

It would be appreciated that what are described above are only several examples of storage characteristics of historical data, not intended to limit the scope of the present invention in any manner. Based on the description above, the storage and/or access of historical data may be monitored by the server, thereby obtaining any additional or alternative storage characteristics. According to embodiments of the present invention, one or more storage characteristics of historical data may be organized in a data structure in any appropriate format, thereby forming a storage pattern of historical data. For example, a plurality of storage characteristics may be organized in any appropriate data structure such as a table, a list, or a queue. The storage pattern may be saved in a text file, a database sheet, an extensive markup language (XML) file, etc.

With continued reference to FIG. 3. The method 300 proceeds to step S340, in which, based on the storage pattern of historical data obtained in step S330, storage of the target data received in step S310 is controlled. According to embodiments of the present invention, the association between the target data and the historical data (i.e., associated with the same or a similar application) is considered in storage management, such that the storage of the target data may be optimized by virtue of the storage pattern of the historical data. Such optimization does not proceed slowly over time. On the contrary, a storage management solution may be designated in an optimized manner at the start of the target data being stored. It should be noted that this may not be achieved by known traditional solutions.

Specifically, in one embodiment, the server may select an appropriate network storage device for the target data, such that the device performance of the selected network storage device conforms to the data storage pattern. For example, if the storage pattern indicates that the access frequency of historical data is very high, the target data may be stored in a network storage device having a high I/O performance (e.g., a shorter I/O response time).

Alternatively or additionally, in one embodiment, if the storage pattern indicates that the historical data will not be modified, but will only be read without being modified (i.e., having a read-only attribute), then the target data may be stored in a network storage device having a read-only storage device. For another example, in one embodiment, if the historical data are determined to be temporal data (i.e., it will be deleted after a shorter time), then the target data may be stored in a network stage device that mainly guarantees the throughput performance, rather than data reliability.

Alternatively or additionally, in one embodiment, if the storage pattern indicates that the target data and a specific previous data have a higher access relevancy, then the server may store the target data in a network storage device that is identical or similar to the previous data, so as to lower the overheads of I/O access.

In particular, in step S340, controlling data storage based on a storage pattern may not only include controlling initial storage of target data, but also may include dynamically adjusting storage of target data based on the storage pattern.

As an example, if the storage pattern indicates that the data size may increase or decrease regularly with time, the server may dump the target data at one or more corresponding time nodes, so as to select a network storage device having an appropriate capacity with change of data size (of course, if the storage resource is relatively sufficient, the target data may also be stored in a network storage device with a larger capacity at the start).

As a further example, suppose that the storage pattern of historical data indicates that the historical data is accessed relatively frequently within a given period of time, but the access frequency significantly decreases after elapse of this period of time. In this case, in one embodiment, the server may store the target data in a network storage device that has a relatively high I/O performance and thus can provide a relatively short response time within the period of time. After elapse of this period of time, the server may dump the target data to a network storage device that is relatively slow, e.g., a storage device specifically for archiving.

Additionally, according to embodiments of the present invention, monitoring of historical data may be performed continuously or periodically. By monitoring relevant historical data over time, the storage pattern may be varied or updated. In response to this update, the server may correspondingly adjust a storage solution of relevant data based on the updated storage pattern. In this way, dynamic optimization of the data storage solution may be achieved.

In particular, after the target data received in step S310 is stored in step S340, the target data per se may be monitored as historical data of an associated application. In other words, after the target data is stored, the server may monitor the characteristics of storage and/or access of the target data so as to update the corresponding data access pattern (if needed). In this manner, dynamic expansion of historical data may be implemented, thereby extracting a more accurate storage pattern on a larger data sample.

Figure 4:
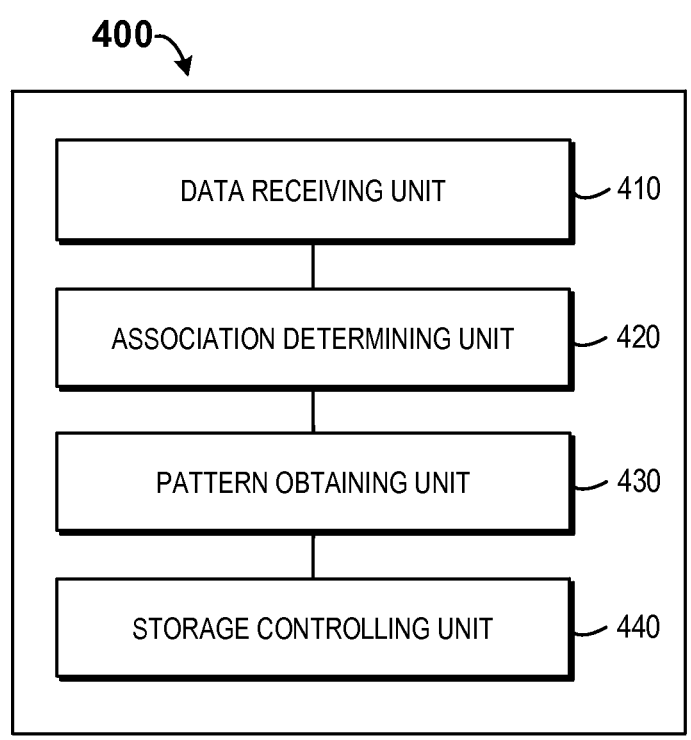
FIG. 4 shows a schematic block diagram of a system for data storage in a network according to embodiments of the present invention.

Referring now to FIG. 4, a schematic block diagram of a system 400 for data storage in a network is shown, according to an exemplary embodiment of the present invention. As shown in FIG. 4, the system 400 may include: a data receiving unit 410 configured to receive target data to be stored from a user device (e.g. user device(s) 220, 230 in FIG. 2); an association determining unit 420 configured to determine an application associated with the target data on the user device; a pattern obtaining unit 430 configured to obtain a storage pattern generated by monitoring historical data, the storage pattern indicating storage characteristics of the historical data, the historical data being associated with the application; and a storage controlling unit 440 configured to control storage of the target data in the network based on the storage pattern.

In one embodiment, the association determining unit 420 may include: a first association determining unit (not shown) configured to determine the application associated with the target data in the user device based on an attribute of the target data. In this embodiment, the first association determining unit may include: a local storage location determining unit configured to determine a local storage location of the target data in the user device; and a second association determining unit (not shown) configured to determine the application associated with the target data in the user device based on the local storage location.

In one embodiment, at least a part of the historical data is collected from at least one further user device that has the application or the similar application. In one embodiment, the storage characteristic of the historical data may include at least one of the following: frequency of access to the historical data; type of access to the historical data; input/output response time of access to the historical data; time length for storage of the historical data; size of the historical data, variation trend of the size of the historical data; and access association between the historical data and other data.

In one embodiment, the storage control unit 440 may include: a storage device selecting unit configured to select a storage device for storing the target data in the network, such that the performance of the storage device matches the storage pattern. Alternatively or additionally, in one embodiment, the storage control unit 440 may include: a data dumping unit configured to change the storage device for storing the target data in the network over time based on the storage pattern.

In one embodiment, the system 400 may further include: a historical data updating unit configured to add the target data into the historical data associated with the application to be monitored. Alternatively or additionally, in one embodiment, the system 400 may further include: a pattern updating unit configured to update the storage pattern by monitoring the historical data after the target data is stored; and a storage adjusting unit configured to adjust storage of the target data based on the updated storage pattern.

It should be noted that for the sake of clarity, FIG. 4 does not show optional units or sub-units included in the system 400. All features and operations as described above are suitable for system 400, respectively, which are therefore not detailed here. Moreover, partitioning of units or subunits in system 400 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the system 400 may be implemented by various manners, including software, hardware, firmware or a random combination thereof. For example, in some embodiments, the apparatus may be implemented by software and/or firmware. Alternatively or additionally, the system 400 may be implemented partially or completely based on hardware. for example, one or more units in the system 400 may be implemented as an integrated circuit (IC) chip, an application-specific integrated circuit (ASIC), a system on chip (SOC), a field programmable gate array (FPGA), etc. The scope of the present intention is not limited to this aspect.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data storage in a network comprising:
receiving, from a user device, a target data to be stored;
determining a local storage location of the target data in the user device;
based on the local storage location of the target data, identifying an application associated with the target data in the user device, wherein the application is running on the user device;
monitoring a historical data associated with the application to identify storage characteristics of the historical data, wherein the historical data comprises previously received and stored data;
based on the monitored historical data, generating a storage pattern, wherein the storage pattern comprises one or more of the storage characteristics organized in a data structure; and
based on a performance of a storage device in a network matching the generated storage pattern, selecting the storage device to store the target data.

2. The method according to claim 1, wherein the local storage location comprises an identifier associated with the application running on the user device.

3. The method according to claim 1, wherein at least a part of the historical data is collected from at least one user device having the application.

4. The method according to claim 1, wherein the storage characteristics of the historical data comprise at least one of:
a frequency of access to the historical data,
a type of access to the historical data,
an input/output response time of access to the historical data,
a time length for storage of the historical data,
a size of the historical data,
a variation trend of the size of the historical data, or
an access association between the historical data and other data.

5. The method according to claim 1, further comprising:
changing storage devices for storing the target data in the network over time based on the storage pattern.

6. The method according to claim 1, further comprising:
adding the target data into the historical data associated with the application.

7. The method according to claim 1, further comprising:
updating the storage pattern by monitoring the historical data after the target data is stored; and
adjusting a storage device for storing the target data in the network based on the updated storage pattern.

8. The method according to claim 1, wherein the data structure comprises: a table, a list or a queue.

9. The method according to claim 1, wherein the storage pattern is saved in a text file, a database sheet, or an extensive markup language.

10. A computer system for data storage in a network comprising:
one or more computer processors, one or more computer-readable storage media, and program instructions stored on the one or more computer-readable storage media for execution by at least one of the one or more processors, the program instructions comprising:
program instructions to receive, from a user device, a target data to be stored;
program instructions to determine a local storage location of the target data in the user device;
based on the local storage location of the target data, program instructions to identify an application associated with the target data in the user device wherein the application is running on the user device;
program instructions to monitor a historical data associated with the application to identify storage characteristics of the historical data, wherein the historical data comprises previously received and stored data;
based on the monitored historical data, program instructions to generate a storage pattern, wherein the storage pattern comprises one or more of the storage characteristics organized in a data structure; and
based on a performance of a storage device in a network matching the generated storage pattern, program instructions to select the storage device to store the target data.

11. The computer system according to claim 10, wherein the local storage location comprises an identifier associated with the application running on the user device.

12. The computer system according to claim 10, wherein at least a part of the historical data is collected from at least one user device having the application.

13. The computer system according to claim 10, wherein the storage characteristics of the historical data comprise at least one of:
a frequency of access to the historical data,
a type of access to the historical data,
an input/output response time of access to the historical data,
a time length for storage of the historical data,
a size of the historical data,
a variation trend of the size of the historical data, and
an access association between the historical data and other data.

14. The computer system according to claim 10, further comprising:
program instructions to change storage devices for storing the target data in the network over time based on the storage pattern.

15. The computer system according to claim 10, further comprising:
program instructions to add the target data into the historical data associated with the application.

16. The computer system according to claim 10, further comprising:
   program instructions to update the storage pattern by monitoring the historical data after the target data is stored; and
   program instructions to adjust a storage device for storing the target data in the network based on the updated storage pattern.

17. The computer system according to claim 10, wherein the data structure comprises: a table, a list or a queue.

18. The computer system according to claim 10, wherein the storage pattern is saved in a text file, a database sheet, or an extensive markup language.

* * * * *